US012524244B2

(12) United States Patent
Yokono et al.

(10) Patent No.: US 12,524,244 B2
(45) Date of Patent: Jan. 13, 2026

(54) ACCELERATOR CONTROL SYSTEM USING CONTROL DATA TO PERFORM ARITHMETIC PROCESSING ON A PLURALITY OF ACCELERATORS

(71) Applicant: NTT, Inc., Tokyo (JP)

(72) Inventors: Tomoya Yokono, Musashino (JP); Yoshiro Yamabe, Musashino (JP); Teruaki Ishizaki, Musashino (JP)

(73) Assignee: NTT, Inc., Tokyo (JP)

( * ) Notice: Subject to any disclaimer, the term of this patent is extended or adjusted under 35 U.S.C. 154(b) by 126 days.

(21) Appl. No.: 18/287,192

(22) PCT Filed: Apr. 22, 2021

(86) PCT No.: PCT/JP2021/016313
§ 371 (c)(1),
(2) Date: Oct. 17, 2023

(87) PCT Pub. No.: WO2022/224409
PCT Pub. Date: Oct. 27, 2022

(65) Prior Publication Data
US 2024/0202033 A1    Jun. 20, 2024

(51) Int. Cl.
*G06F 9/38* (2018.01)
*G06F 13/16* (2006.01)

(52) U.S. Cl.
CPC .......... *G06F 9/3881* (2013.01); *G06F 9/3885* (2013.01); *G06F 13/1673* (2013.01)

(58) Field of Classification Search
CPC ... G06F 13/1673; G06F 15/167; G06F 9/3881
See application file for complete search history.

(56) References Cited

U.S. PATENT DOCUMENTS 11,321,254 B2 * 5/2022 Kim .................... G06F 13/1673
2008/0244126 A1   10/2008 Hundley
(Continued)

OTHER PUBLICATIONS

Yang et al., "When Poll is Better than Interrupt", Fast, vol. 12, Available Online at: https://www.usenix.org/system/files/conference/fast12/yang.pdf, 2012, pp. 1-7.

(Continued)

*Primary Examiner* — Courtney P Spann
(74) *Attorney, Agent, or Firm* — XSENSUS LLP (57) ABSTRACT

An accelerator control system includes an accelerator control device and a plurality of accelerators, wherein the accelerator control device includes first processing circuitry configured to store control data including a location of data which is an arithmetic processing target, information on an accelerator for performing arithmetic processing, and information specifying content of the arithmetic processing of the accelerator, and determine completion of the arithmetic processing by the accelerator when the control data which has been subjected to the arithmetic processing by the accelerator is stored in a storage, and each of the accelerators includes second processing circuitry configured to acquire the control data from the storage, and perform arithmetic processing on the data which is an arithmetic processing target according to the location of the data which is an arithmetic processing target and information specifying the content of the arithmetic processing of the accelerator included in the acquired control data.

8 Claims, 8 Drawing Sheets

(56) References Cited

U.S. PATENT DOCUMENTS

2018/0095750 A1    4/2018  Drysdale et al.
2021/0191728 A1*  6/2021  Ahn .................. G06F 13/12

OTHER PUBLICATIONS

"CUDA Toolkit Documentation v11.2.2", Nvidia, Available Online at: https://docs.nvidia.com/cuda/, Retrieved from the net on: Mar. 29, 2021, 1 page.

Gulati et al., "GPU Architecture and the CUDA Programming Model", Hardware acceleration of EDA algorithms, Available Online at: https://link.springer.com/content/pdf/10.1007%2F978-1-4419-0944-2_3.pdf, 2010, pp. 23-30.

* cited by examiner

| 63 | | 0 |
|---|---|---|
| TASK ID | | OPERATION |
| LENGTH OF READ DATA | | ADDRESS OF READ DATA |
| ADDRESS OF READ DATA | | LENGTH OF WRITE DATA |
| ADDRESS OF WRITE DATA | | |

ACCELERATOR CONTROL SYSTEM USING CONTROL DATA TO PERFORM ARITHMETIC PROCESSING ON A PLURALITY OF ACCELERATORS

CROSS-REFERENCE TO RELATED APPLICATION

The present application is based on PCT filing PCT/JP2021/016313, filed Apr. 22, 2021, the entire contents of which are incorporated herein by reference.

TECHNICAL FIELD

The present invention relates to an accelerator control system, an accelerator control method, and an accelerator control program.

BACKGROUND ART

Conventionally, technology for increasing a processing speed by incorporating a plurality of arithmetic accelerators into an arithmetic processing system is known. Since it is difficult to improve the operating frequency of a processor and to highly integrate arithmetic units due to the limitation of semiconductor microfabrication technology, processing is offloaded to an accelerator in a specialized manner for specific processing by this technology, and high-performance calculation is realized. Further, by operating a plurality of accelerators in cooperation, the speed of processing constituted of a plurality of arithmetic operations is increased (refer to Non Patent Literature 1 to 3).

Specifically, it is necessary to control inter-accelerator communication for transmitting an arithmetic result of a certain accelerator to another accelerator. Then, a CPU controls data communication between the accelerators after completion of arithmetic processing in a transfer source accelerator. The CPU transmits a control signal for requesting preparation of data reception to a transfer destination accelerator, and then transmits a control signal for transfer start to the transfer source accelerator, thereby driving data communication between the accelerators. After data communication between the accelerators, the transfer destination accelerator performs arithmetic processing on data.

CITATION LIST

NON PATENT LITERATURE

[Non Patent Literature 1] J. Yang, D. B. Minturn, F. Hady, "When Poll is Better than Interrupt," FAST, vol. 12, pp. 3-3, [online], 2012, [Retrieved on Mar. 29, 2021], Internet <URL: . usenix.org/system/files/conference/fast12/yang.pdf>
[Non Patent Literature 2] "CUDA Toolkit Documentation v11.2.2," [online], NVIDIA, [Retrieved on Mar. 29, 2021], Internet <URL: ://docs.nvidia.com/cuda/>
[Non Patent Literature 3] K. Gulati, S. P. Khatri, "GPU Architecture and the CUDA Programming Model," Hardware acceleration of EDA algorithms, pp. 23-30, [online], Springer, [Retrieved on Mar. 29, 2021], Internet <URL: <URL: ://link.springer.com/content/pdf/10.1007% 2F978-1-4419-0944-2_3.pdf>

SUMMARY OF INVENTION

Technical Problem

However, in the conventional technology, it is sometimes difficult to increase the speed of real-time processing using a plurality of accelerators. For example, since accelerators are controlled by the CPU, exclusive control of the transfer source accelerator and the transfer destination accelerator, interruption notification of processing completion, and synchronous control occur each time processing of data transfer between the accelerators occurs. Such processing becomes overhead and thus delay time increases. Further, when a large number of accelerators are used, there are cases where direct data transfer between accelerators is impossible due to the specifications of a bus in addition to the aforementioned overhead, and thus scalability is reduced. Therefore, it is difficult to use accelerators in real time processing or in various processing areas.

In view of the above-described circumstances, an object of the present invention is to increase the speed of real-time processing using a plurality of accelerators.

Solution to Problem

In order to solve the above-described problems and achieve the object, an accelerator control system includes an accelerator control device and a plurality of accelerators, wherein the accelerator control device includes: first_processing circuitry configured to: store control data including a location of data which is an arithmetic processing target, information on an accelerator for performing arithmetic processing, and information specifying content of the arithmetic processing of the accelerator; and determine completion of the arithmetic processing by the accelerator when the control data which has been subjected to the arithmetic processing by the accelerator is stored in a storage, and each of the accelerators includes: second processing circuitry configured to: acquire the control data from the storage; perform arithmetic processing on the data which is an arithmetic processing target according to the location of the data which is an arithmetic processing target and information specifying the content of the arithmetic processing of the accelerator included in the acquired control data; store the control data in the storage when the arithmetic processing is completed and the control data does not include information on a transfer destination accelerator; transfer the control data to the transfer destination accelerator when the control data includes information on the transfer destination accelerator; and perform arithmetic processing on the data which is an arithmetic processing target according to the location of the data which is an arithmetic processing target and information specifying the content of the arithmetic processing included in the control data when the control data has been received from another accelerator.

Advantageous Effects of Invention

According to the present invention, it is possible to increase the speed of real-time processing using a plurality of accelerators.

DESCRIPTION OF EMBODIMENTS

An embodiment of the present invention will be described in detail below with reference to the drawings. Note that the present invention is not limited to the embodiment. Furthermore, the same constituent elements are denoted by the same reference numerals in the description of the drawings.

Figure 1:
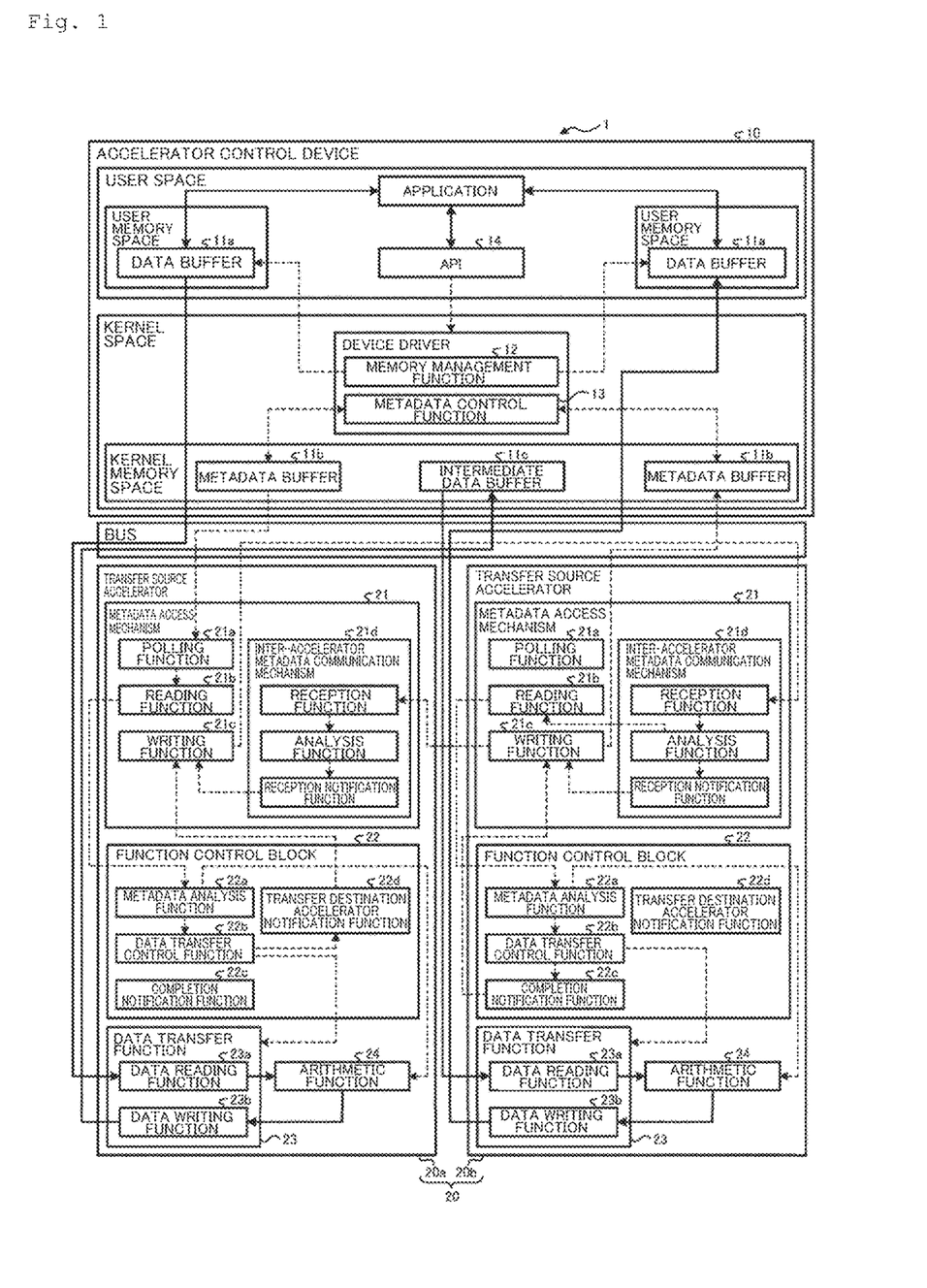
FIG. 1 is a schematic diagram illustrating an overall configuration of an accelerator control system of the present embodiment.

[Configuration of accelerator control system] FIG. 1 is a schematic diagram illustrating an overall configuration of an accelerator control system according to the present embodiment. As shown in FIG. 1, the accelerator control system 1 includes an accelerator control device 10 and a plurality of accelerators 20. The accelerator control device 10 and the accelerators 20 can mutually perform data communication through a communication line such as bus wiring.

The accelerator control device 10 is an information processing device realized using a general-purpose processor such as a central processing unit (CPU). In the accelerator control device 10, an application which is processing defined by a user is executed in a user space. In addition, operation and management of physical devices such as the accelerators 20 and abstraction processing of the physical devices in user space processing are performed in a kernel space.

A user memory space and a kernel memory space are realized by a semiconductor memory element such as a random access memory (RAN) or a flash memory, or a storage device such as a hard disk or an optical disk and serve as a storage unit. A processing program for operating the accelerator control device 10, data used during execution of the processing program, and the like are stored in advance or stored temporarily each time processing is performed in the storage unit.

A control unit realized using a general-purpose processor serves as each functional unit such as a memory management function 12 and a metadata control function 13 of a device driver, or an API 14 which will be described later by executing the processing program stored in the memory, as illustrated in FIG. 1. Note that the control unit may include another functional unit that is not shown.

In the accelerator control device 10, data that is an arithmetic processing target (hereinafter also referred to as processing data) is arranged in a data buffer 11a of the user memory space in the user space. Further, control data (hereinafter also referred to as metadata) including the location of data that is an arithmetic processing target and information specifying the content of arithmetic processing of an accelerator is arranged in a metadata buffer 11b of the kernel memory space in the kernel space.

The accelerator 20 is an arithmetic accelerator realized by a graphics processing unit (GPU), a field programmable gate array (FPGA), a data processing unit (DPU) or the like, and as illustrated in FIG. 1, serves as functional units such as a metadata access mechanism 21, a function control block 22, a data transfer function 23, an arithmetic function 24, and the like.

The accelerator 20 reads processing data and metadata to realize offload of arithmetic processing. Specifically, the accelerator 20 monitors whether or not metadata is arranged in the metadata buffer 11b according to autonomous polling. When the metadata is arranged, the accelerator 20 reads the arranged metadata, analyzes it, and drives the accelerator 20. In addition, the accelerator 20 stores the result of arithmetic processing performed on the processing data in the data buffer 11a.

The accelerator control device 10 can proceed to the next processing asynchronously with the accelerator 20. The accelerator 20 arranges the metadata in the metadata buffer 11b when the arithmetic processing is completed. Accordingly, the accelerator control device 10 considers that the arithmetic processing has been completed. Further, the accelerator control device 10 acquires the result of arithmetic processing performed on the processing data from the data buffer 11a and proceeds to the next processing.

Specifically, the accelerator control device 10 determines the operation of the accelerator 20 by arranging metadata including the location of processing data and the content of arithmetic processing in the metadata buffer 11b in the kernel memory space through the metadata control function 13 mounted in the device driver.

The accelerator control device 10 creates a data buffer 11a which can be referred to by the accelerator control device 10 and the accelerator 20 in the user memory space via the memory management function 12, and arranges the processing data.

The accelerator 20 has a metadata access mechanism 21. The metadata access mechanism 21 has a function of polling the metadata buffer 11b in the kernel memory space, a function of reading metadata, and a function of writing metadata into the metadata buffer, and can autonomously read metadata without depending on an explicit control signal from the accelerator control device 10.

The accelerator 20 is notified of information such as an address of the metadata buffer 11b by an accelerator initialization function at the time of loading the device driver.

The accelerator 20 reads metadata from a metadata buffer 11b, and a metadata analysis function 22a analyzes the data, and operates according to the description. The accelerator 20 drives a data reading function 23a in the data transfer function 23 on the basis of information on the address and length of the processing data included in the metadata, reads the processing data from the data buffer 11a, and uses it for an arithmetic operation in the arithmetic function 24. In the arithmetic function 24, arithmetic processing is executed on the basis of arithmetic information described in the metadata. The metadata analysis function 22a transfers the analysis result to the arithmetic function 24, and sets the content of arithmetic processing by the arithmetic function 24.

After arithmetic processing is completed, the result of arithmetic processing is transferred from the arithmetic function 24 to a data writing function 23b and written in a data buffer designated by a data transfer control function 22b. Thereafter, a notification indicating that data transfer is completed is transmitted from the data transfer function 23 to a completion notification function 22c, the metadata is written in the metadata buffer 11b by a writing function of the metadata access mechanism 21, and the operation of the accelerator 20 is completed.

In this manner, in the accelerator control system 1, metadata for controlling data transfer and arithmetic processing is arranged in a main memory, and the accelerator 20 autonomously performs polling and reading. Accordingly, overhead of accelerator control such as interruption is reduced, and real-time processing can be performed.

In addition, since the accelerator 20 can directly transfer processing data to the user space of the accelerator control device 10 and the accelerator control device 10 and the accelerator 20 can be driven asynchronously, delay and CPU use rate are reduced.

Further, since the accelerator 20 can operate by accessing the main memory of the accelerator control device 10, extension to a plurality of accelerators 20 can be achieved and thus scalability is greatly improved.

When arithmetic processing is performed using a plurality of accelerators 20, the metadata further includes information on accelerators which will perform arithmetic operation, and information such as operations in accelerators and a location of processing data to be read. Based on such information, a transfer source accelerator 20a creates settings and control information (hereinafter referred to as metadata or inter-accelerator metadata) of a transfer destination accelerator 20b and directly performs data communication of metadata between accelerators without passing through the accelerator control device 10.

After the arithmetic processing is completed, the transfer source accelerator 20a outputs the arithmetic processing result to an intermediate data buffer 11c on the kernel memory space and transmits the metadata to the transfer destination accelerator 20b.

The transfer destination accelerator 20b determines whether or not the transmitted metadata can be received in the current state of the accelerator 20b. When the metadata can be received, the transfer destination accelerator 20b notifies the transfer source accelerator 20a of completion of reception. The transfer source accelerator 20a is in a standby state until completion of reception is notified from the transfer destination accelerator 20b, and when completion of reception is not notified within a predetermined time, retransmits the metadata to the transfer destination accelerator 20b.

The transfer destination accelerator 20b analyzes the received metadata to read intermediate data of the intermediate data buffer 11c and execute arithmetic processing.

Specifically, when the plurality of accelerators 20 cooperate with each other, information for operation with the plurality of accelerators 20 is described in the metadata. The accelerator 20 analyzes the metadata read by the metadata analysis function 22a to perform inter-accelerator data communication after completion of arithmetic processing.

First, the transfer source accelerator 20a outputs the arithmetic result of processing data to be transferred to the transfer destination accelerator 20b to the intermediate data buffer 11c in the kernel memory space after completion of arithmetic processing.

Thereafter, the transfer source accelerator 20a transmits position information and arithmetic content of the arithmetic processing result, and metadata including information on cooperation of the accelerators to the transfer destination accelerator 20b via the bus through a transfer destination accelerator notification function 22d.

The transfer destination accelerator 20b receives the metadata through a reception function of an inter-accelerator metadata communication mechanism 21d. The metadata is transmitted to the analysis function, and whether or not the metadata is received is determined on the basis of the state of the accelerator. At that time, a reception notification function of the inter-accelerator metadata communication mechanism 21d generates information on whether or not the reception is performed and returns the information to the transfer source accelerator 20a.

The transfer source accelerator 20a in the standby state considers that transfer is completed by receiving a notification of completion of reception from the transfer destination accelerator 20b and proceeds to the next processing. When there is no notification of completion of reception within a predetermined time, the transfer source accelerator 20a retransmits the metadata.

When the transferred metadata can be received, the transfer destination accelerator 20b executes arithmetic processing on the basis of the metadata read from the analysis function of the inter-accelerator metadata communication mechanism 21d.

In this manner, processing using the plurality of accelerators 20 is executed without passing through the accelerator control device 10 in the accelerator control system 1, and thus overhead such as exclusive processing of transfer source acceleration/transfer destination acceleration, interrupt notification of completion of processing, and synchronous control is decreased and scalability is not reduced. Further, in communication processing, the accelerator control device 10 can be driven asynchronously with each accelerator 20, and thus respective arithmetic resources can be effectively utilized. In addition, data sources can be referred to from the plurality of accelerators 20 without control of the accelerator control device 10 by using the main memory for transfer of processing data. Therefore, data transfer can be performed regardless of the specifications of the bus, and a system corresponding to scalable and wide workloads can be constructed.

Figure 2:
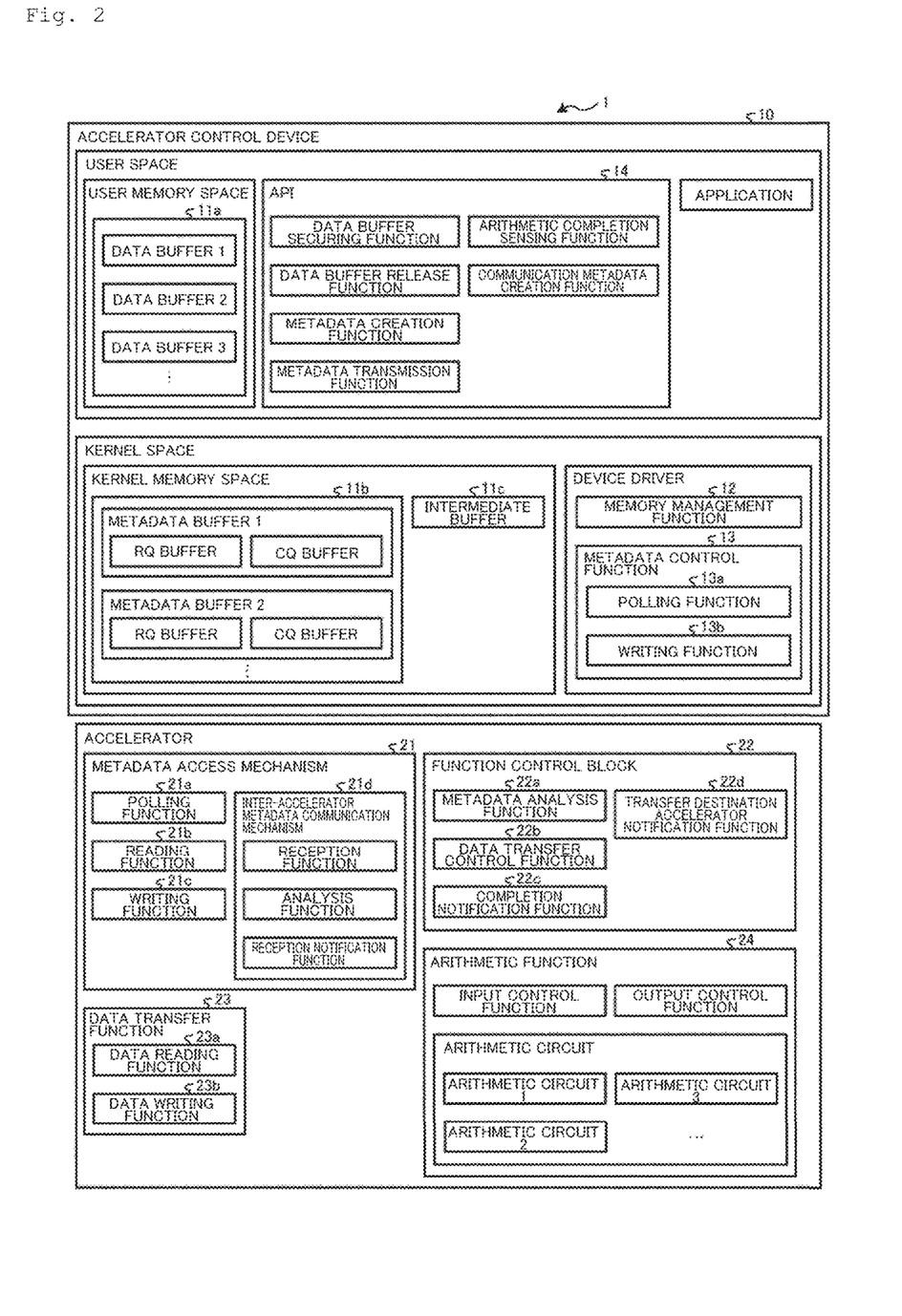
FIG. 2 is a diagram for describing the accelerator control system of the present embodiment.

[Accelerator control device] FIG. 2 is a diagram for describing a configuration of the accelerator control system of the present embodiment. As illustrated in FIG. 2, in the accelerator control device 10, the API 14 is a group of functions that can be called through an application and provides functions necessary for the operation of the accelerator 20. For example, the API serves as a data buffer securing function, a data buffer releasing function, a metadata creation function, a metadata transmission function, an arithmetic completion sensing function, and a communication metadata creation function.

The data buffer securing function generates the data buffer 11a which is a storage area for transmitting/receiving data to/from the accelerator 20. The data buffer securing function calls the memory management function 12 and acquires area information of the data buffer 11a from the memory management function 12.

The data buffer release function deletes the data buffer 11a. The data buffer release function calls the memory management function 12, notifies of the area information of the data buffer 11a to be released, and releases the area.

The metadata creation function creates metadata that is control data to which control information of the accelerator 20 has been added. The metadata transmission function transmits the metadata created by the metadata creation function to the metadata control function 13. The arithmetic completion sensing function calls the metadata control function 13 and checks whether or not processing of an arbitrary accelerator 20 is completed according to a return value of the metadata control function 13. The communication metadata creation function creates communication path information for performing inter-accelerator communication. The device driver is present in the kernel space and provides a function group such as the memory management function 12 and the metadata control function 13 for handling a specific device.

The memory management function 12 is called from the API 14 in the user space, and secures, releases and manages the area of the data buffer 11a.

The metadata buffer 11b is a storage area for transmitting/receiving metadata to/from the accelerator 20 and is generated depending on the number of accelerators 20 by an accelerator initialization function. For example, the metadata buffer 11b stores control data including the location of data that is an arithmetic processing target, information on an accelerator 20 which will perform arithmetic processing, and information specifying the content of the arithmetic processing of the accelerator 20.

The metadata buffer 11b is composed of a request queue (RQ) buffer for transmitting metadata to the accelerator 20 and a completion queue (CQ) buffer for receiving metadata from the accelerator 20.

The metadata control function 13 is called from the API 14 in the user space and performs reading, writing and management with respect to the RQ buffer/CQ buffer of the metadata buffer 11b. The metadata control function 13 has a polling function 13a and a writing function 13b.

The polling function 13a polls the CQ buffer and confirms completion of an arithmetic operation. That is, the polling function 13a serves as a determination unit to monitor whether or not metadata that has been subjected to arithmetic processing by the accelerator 20 is stored in the metadata buffer 11b. Then, the polling function 13a determines completion of the arithmetic processing by the accelerator 20 when the metadata that has been subjected to the arithmetic processing by the accelerator 20 has been stored in the metadata buffer 11b. The writing function 13b performs writing into the RQ buffer.

[Accelerator] In the accelerator 20, the metadata access mechanism 21 includes, as functions for accessing the metadata buffer 11b in the kernel space, a polling function 21a, a reading function 21b, a writing function 21c and an inter-accelerator metadata communication mechanism 21d.

The polling function 21a polls the RQ buffer of the metadata buffer 11b to check whether or not metadata is present in the RQ buffer. That is, the polling function 21a serves as a monitoring unit to monitor whether or not metadata is present in the metadata buffer 11b.

The reading function 21b serves as an acquisition unit to acquire metadata from the metadata buffer 11b. That is, the reading function 21b reads metadata and transfers it to the function control block 22 when the polling function 21a confirms that the metadata is present in the RQ buffer.

The writing function 21c writes metadata in the CQ buffer of the metadata buffer 11b. That is, the writing function 21c serves as a storage unit, and when arithmetic processing is completed, stores metadata in the metadata buffer 11b if information on the transfer destination accelerator 20b is not included in the metadata.

The function control block 22 controls sharing, driving and pause timing of necessary data for each functional unit of the accelerator 20. The function control block 22 includes the metadata analysis function 22a, the data transfer control function 22b, the completion notification function 22c, and the transfer destination accelerator notification function 22d.

The metadata analysis function 22a extracts information on an operation, and the address and length of the data buffer 11a from metadata transmitted from the metadata access mechanism 21. The data transfer control function 22b provides a function for controlling reading and writing of data in the data transfer function 23. The completion notification function 22c transfers metadata to be written in the CQ buffer to the metadata access mechanism 21.

The arithmetic function 24 serves as an arithmetic unit to perform arithmetic processing on processing data that is an arithmetic processing target according to information specifying the location of the processing data that is the arithmetic processing target and the content of arithmetic processing of the accelerator 20 included in the acquired metadata.

Specifically, the arithmetic function 24 includes an input control function, an arithmetic circuit, and an output control function. The arithmetic circuit includes a plurality of independent arithmetic circuits and can define an arithmetic operation for each thereof. The input control function inputs data transmitted from the data reading function 23a of the data transfer function 23 to an appropriate arithmetic circuit on the basis of information on metadata transmitted from the function control block 22.

The output control function transfers the result of arithmetic processing performed on the processing data output from the arithmetic circuit to the data writing function 23b of the data transfer function 23 at appropriate timing.

The data writing function 23b of the data transfer function 23 serves as a storage unit to store the result of arithmetic processing performed on the processing data in the data buffer 11a.

Figure 3:
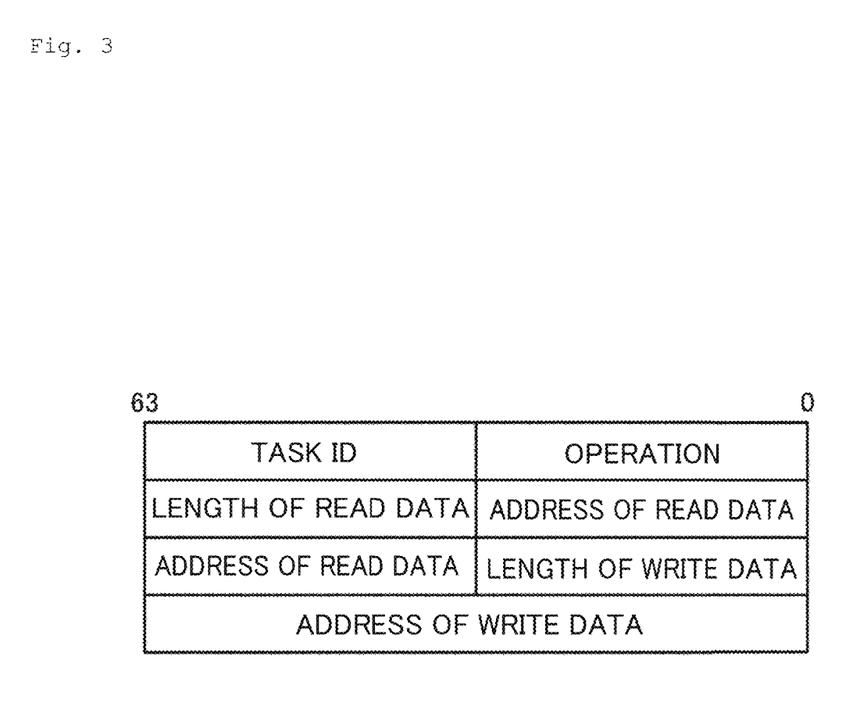
FIG. 3 is a diagram illustrating a data configuration of metadata.

FIG. 3 is a diagram illustrating a data configuration of metadata. As shown in FIG. 3, the metadata is composed of a total of 256-bit data including a 32-bit task ID, a 32-bit operation, a 32-bit read data length, a 64-bit read data address, a 32-bit write data length, and a 64-bit write data address.

Figure 4:
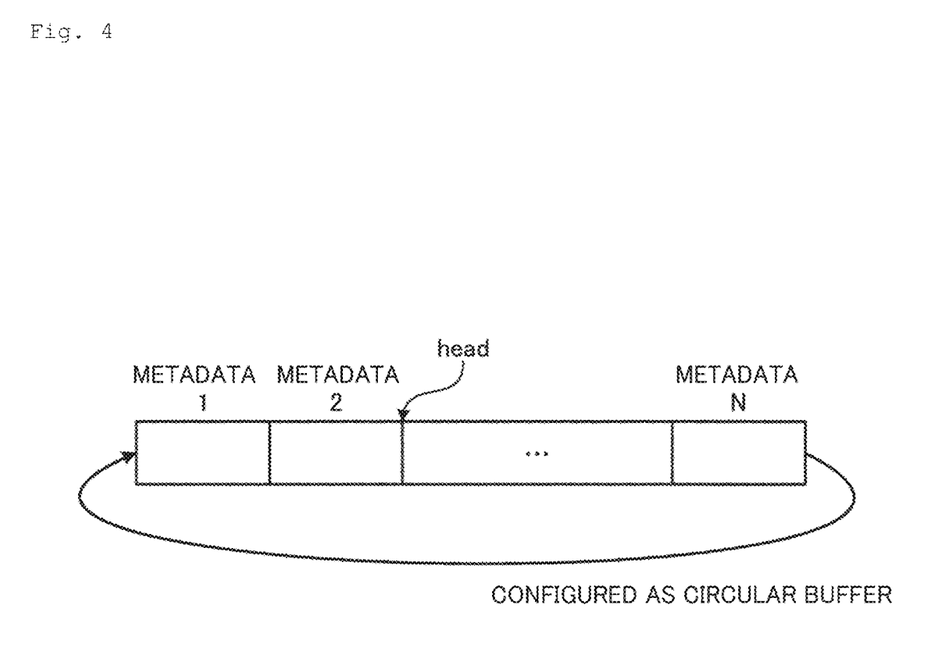
FIG. 4 is a diagram illustrating a structure of a metadata buffer.

FIG. 4 is a diagram illustrating a structure of the metadata buffer. As shown in FIG. 4, the metadata shown in FIG. 3 is stored in the RQ buffer/CQ buffer. Head information of the RQ buffer shown in FIG. 4 is controlled by the metadata control function 13. The metadata control function 13 forms the metadata transmitted from the metadata transmission function of the API 14 into the configuration shown in FIG. 3, stores the metadata in the RQ buffer, and then shifts the head information to the next position.

Similarly, with respect to the CQ buffer, the metadata control function 13 also reads metadata from the CQ buffer using the head information and shifts the head to the next position when called by the arithmetic completion sensing function of the API 14.

Figure 5:
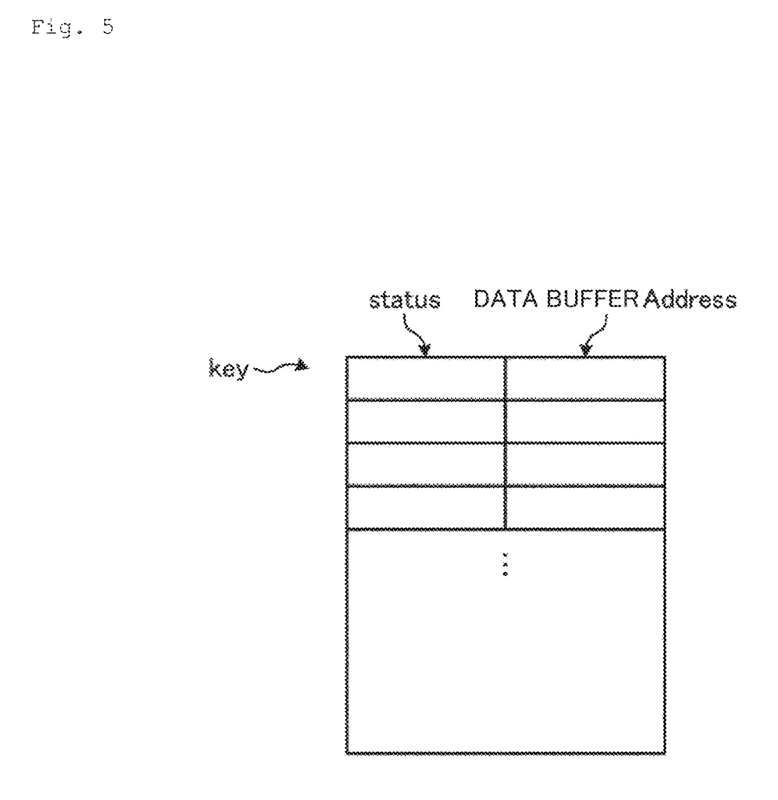
FIG. 5 is a diagram for describing a data buffer.

FIG. 5 is a diagram for describing the data buffer. The memory management function 12 manages the address and status of the data buffer 11a through a table illustrated in FIG. 5. As shown in FIG. 5, the physical address of the data buffer 11a and the status of the address are managed through the table. At the time of setting metadata for the accelerator 20, a physical address of a desired data buffer 11a is acquired and a read data address and a write data address are set by referring to a key. Accordingly, differences between virtual addresses in the kernel space and the user space can be absorbed and managed.

Return to the description of FIG. 2. The aforementioned writing function 21c serves as a transfer unit to transfer metadata to the transfer destination accelerator 20b when the metadata includes information on the accelerator 20b.

The inter-accelerator metadata communication mechanism 21d includes a reception function, an analysis function, and a reception notification function and provides functions necessary for inter-accelerator communication. The reception function serves as a checking unit to check whether or not metadata can be received from another accelerator 20a. That is, the reception function generates data for notifying of whether or not metadata transmitted from another accelerator 20 (transfer source accelerator 20a) can be received, and transmits the data to the transfer source accelerator 20a.

The transfer destination accelerator notification function 22d of the function control block 22 provides a function of notifying the transfer destination accelerator 20b of metadata. The metadata analysis function 22a extracts information on an operation, and the address and length of a data buffer from the metadata sent from the metadata access mechanism 21. In addition, the metadata analysis function 22a extracts information on the transfer destination accelerator 20b from the metadata. The metadata analysis function 22a retransmits the metadata through the transfer destination accelerator notification function 22d and the writing function 21c when there is no notification of completion of reception from the transfer destination accelerator 20b. The writing function 21c retransmits the metadata when the transfer destination accelerator 20b does not notify of whether or not the metadata can be received within a predetermined time.

In the transfer destination accelerator 20b, the arithmetic function 24 serves as a second arithmetic unit, and as will be described later, performs arithmetic processing on intermediate data that is an arithmetic processing target according to the location of the intermediate data that is an arithmetic operation target and information specifying the content of the arithmetic processing included in the metadata when the metadata has been received from the other accelerator 20a.

The data writing function 23b of the data transfer function 23 stores intermediate data that is the result of arithmetic processing performed on processing data that is an arithmetic processing target in the intermediate data buffer 11c when the metadata has been transferred to the transfer destination accelerator 20b. In the transfer destination accelerator 20b, the arithmetic function 24 reads the result of arithmetic processing stored in the intermediate data buffer 11c and sets it an arithmetic processing target.

Figure 6:
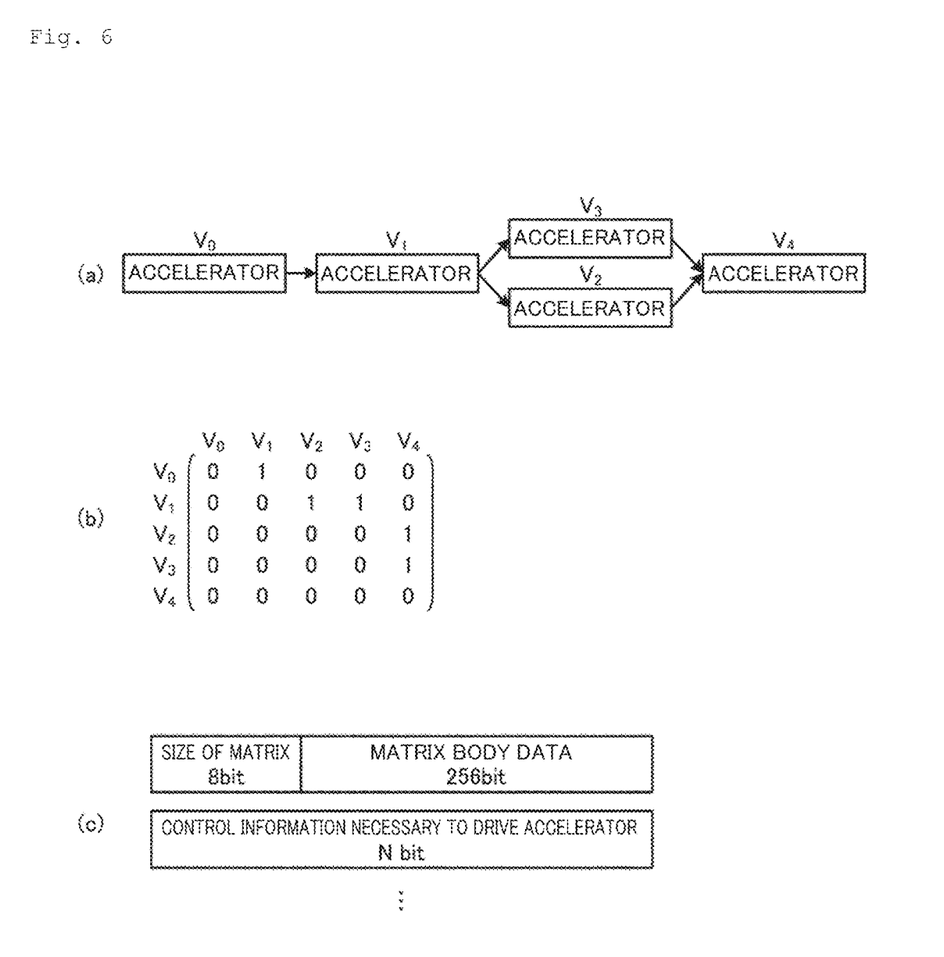
FIG. 6 is a diagram for describing inter-accelerator communication.

Here, FIG. 6 is a diagram for describing inter-accelerator communication. In the accelerator control system 1, inter-accelerator communication is realized using metadata. As shown in FIG. 6(a), a communication path of inter-accelerator communication is represented by a graph having respective accelerators 20 as vertexes $V_0, V_1, V_2, \ldots$. This graph is represented as an adjacency matrix to be handled as data. For example, the graph illustrated in FIG. 6(a) can be represented as an adjacency matrix as shown in FIG. 6(b).

Such information can be handled by the accelerator 20 by being constructed in a data structure shown in FIG. 6(c). In the data structure shown in FIG. 6(c), an 8-bit head represents the size of the matrix, and the accelerator 20 can ascertain the size of the data of the matrix body. The following 256 bits are data of the matrix body and include information on connection between accelerators. In the following field, information such as the content of arithmetic operation for driving the transfer destination accelerator 20b and the location of processing data is described.

Figure 7:
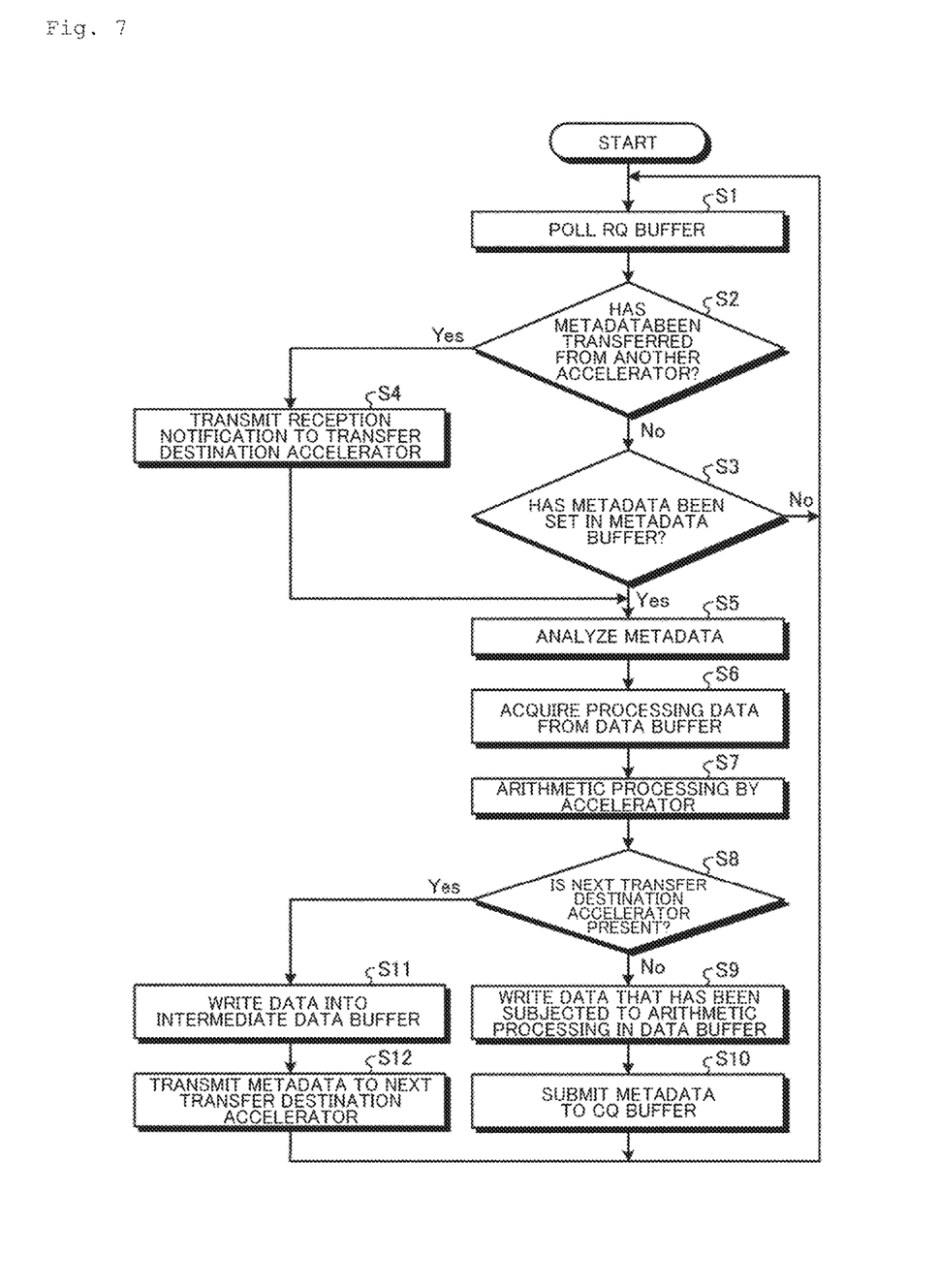
FIG. 7 is a flowchart showing an accelerator control processing procedure in an accelerator.

[Accelerator control processing] Next, FIG. 7 is a flowchart showing an accelerator control processing procedure in the accelerator 20. The flowchart of FIG. 7 is started at a timing at which, for example, an application instructs starting.

The flowchart of FIG. 7 is started at predetermined intervals, for example. The accelerator 20 monitors the RQ buffer of the metadata buffer 11b by polling (step S1). Further, the accelerator 20 checks whether or not metadata is transferred from another accelerator 20 (step S2).

If no metadata is transferred from the other accelerator 20 (No in step S2), the accelerator 20 proceeds to step S3. On the other hand, if metadata is transferred from the other accelerator 20 (Yes in step S2), the accelerator 20 (transfer destination accelerator 20b) transmits a notification of completion of reception of the metadata to the transfer source accelerator 20a, analyzes the metadata (step S4), and proceeds to step S5.

If metadata is not set in the RQ buffer in step S3 (No in step S3), the accelerator 20 returns to step S1. On the other hand, if the metadata is set in the RQ buffer (Yes in step S3), the accelerator 20 reads the metadata and analyzes it (step S5).

The accelerator 20 acquires processing data of a data buffer 11a on the basis of the analysis result (step S6) and performs arithmetic processing (step S7).

If a transfer destination accelerator 20 is not present (No in step S8), the accelerator 20 writes processing data that has been subjected to arithmetic processing into the data buffer 11a (step S9), transmits metadata to the CQ buffer (step S10), and ends processing. Thereafter, the accelerator 20 returns to step S1.

On the other hand, if the transfer destination accelerator 20 is present (Yes in step S8), the accelerator 20, as a transfer source accelerator 20a, writes the result of the arithmetic processing of the processing data into an intermediate data buffer 11c (step S11), and transmits the metadata to the transfer destination accelerator 20b (step S12). Then, when a notification of completion of reception from the transfer destination accelerator 20b is received, the accelerator 20 considers that transfer of the metadata is completed and returns to the step S1.

[Effects] As described above, in the accelerator control system 1 of the present embodiment, the metadata buffer 11b stores control data including the location of data which is an arithmetic processing target, information on an accelerator 20 which will perform arithmetic processing, and information specifying the content of the arithmetic processing of the accelerator 20 in the accelerator control device 10. The polling function 13a determines completion of the arithmetic processing performed by the accelerator 20 when metadata that has been subjected to the arithmetic processing performed by the accelerator 20 is stored in the metadata buffer 11b.

Further, in the accelerator 20, the reading function 21b acquires metadata from the metadata buffer 11b. The arithmetic function 24 performs arithmetic processing on processing data that is an arithmetic processing target according to information specifying the location of the processing data that is an arithmetic processing target and the content of the arithmetic processing of the accelerator 20 included in the acquired metadata. When the arithmetic processing is completed and information on the transfer destination accelerator is not included in the metadata, the writing function 21c stores the metadata in the metadata buffer 11b. When the information on the transfer destination accelerator 20b is included in the metadata, the writing function 21c transfers the control data to the accelerator 20b. When the metadata is received from the other accelerator 20a, the arithmetic function 24 performs arithmetic processing on intermediate data that is an arithmetic processing target according to the location of the intermediate data that is an arithmetic processing target and information specifying the content of the arithmetic processing included in the metadata.

Accordingly, since processing using a plurality of accelerators 20 is executed without passing through the accelerator control device 10, the accelerator control system 1 can perform real-time processing at a high speed without deteriorating scalability by reducing overhead such as exclusive processing of transfer source acceleration/transfer destination acceleration, interrupt notification of completion of processing, and synchronous control.

The inter-accelerator metadata communication mechanism 21d checks whether or not metadata can be received from another accelerator 20a. Accordingly, data transfer between accelerators is surely executed.

Further, the writing function 21c retransmits metadata when the transfer destination accelerator 20b does not notify of whether or not the metadata can be received within a predetermined time. Accordingly, data transfer between accelerators is surely executed.

Further, when the metadata is transferred to the transfer destination accelerator 20b, the data writing function 23b stores intermediate data that is the result of arithmetic processing performed on processing data that is an arithmetic processing target in the intermediate data buffer 11c. In the transfer destination accelerator 20b, the arithmetic function 24 reads the result of arithmetic processing stored in the intermediate data buffer 11c and sets it as an arithmetic processing target. Accordingly, data transfer between accelerators is efficiently completed.

Further, the polling function 21a monitors whether or not metadata is present in the metadata buffer 11b. Accordingly, the accelerator 20 can autonomously perform processing.

Further, the polling function 13a monitors whether or not metadata that has been subjected to arithmetic processing is present in the metadata buffer 11b. Accordingly, the accelerator control device 10 can perform processing asynchronously with the accelerator 20.

[Program] It is also possible to create a program in which processing executed by the accelerator control device 10 according to the above-described embodiment is described in a language executable by a computer. As one embodiment, the accelerator control device 10 can be implemented by installing an accelerator control program for executing the aforementioned accelerator control processing as package software or online software in a desired computer. For example, by causing an information processing device to execute the accelerator control program, the information processing device can be caused to serve as the accelerator control device 10. The information processing device mentioned here includes a desktop type or laptop type personal computer. In addition, the information processing device includes a mobile communication terminal such as a smartphone, a mobile phone or a personal handyphone system (PHS), a slate terminal such as a personal digital assistant (PDA), or the like. Furthermore, the functions of the accelerator control device 10 may be implemented in a cloud server.

Figure 8:
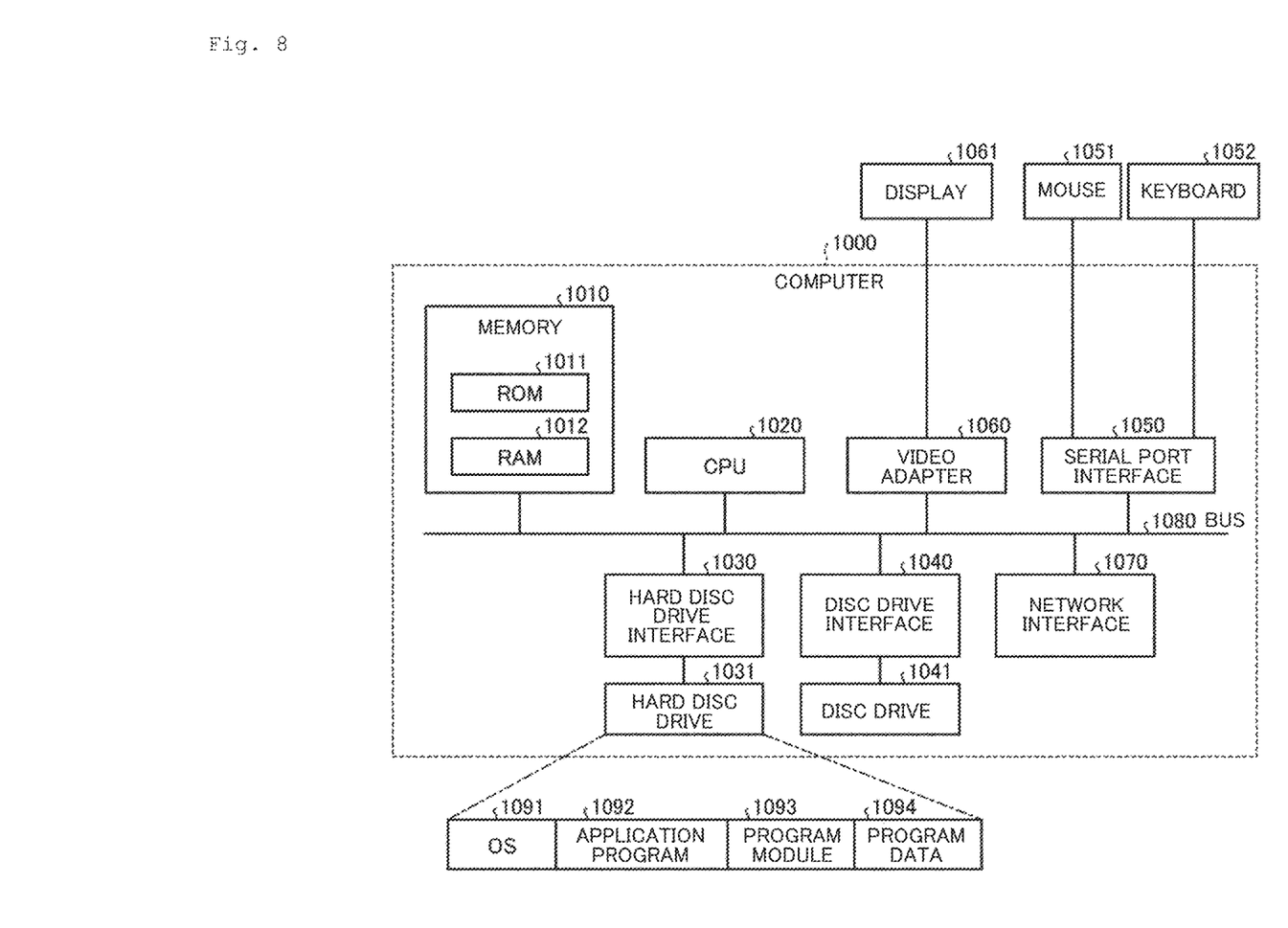
FIG. 8 is a diagram showing an example of a computer executing an accelerator control program.

FIG. 8 is a diagram illustrating an example of a computer that executes the accelerator control program. A computer 1000 has a memory 1010, a CPU 1020, a hard disk drive interface 1030, a disk drive interface 1040, a serial port interface 1050, a video adapter 1060, and a network interface 1070, for example. These units are connected through a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1031. The disk drive interface 1040 is connected to the disk drive 1041. A removable storage medium such as a magnetic disk or an optical disk is inserted into the disk drive 1041. For example, a mouse 1051 and a keyboard 1052 are connected to the serial port interface 1050. For example, a display 1061 is connected to the video adapter 1060.

Here, the hard disk drive 1031 stores, for example, an OS 1091, an application program 1092, a program module 1093, and program data 1094. Each of the pieces of information described in the above embodiment is stored in, for example, the hard disk drive 1031 or the memory 1010.

The accelerator control program is stored in the hard disk drive 1031 as the program module 1093 in which commands executed by the computer 1000 are described, for example. Specifically, the program module 1093 in which each type of processing executed by the accelerator control device 10 described in the aforementioned embodiment is described is stored in the hard disk drive 1031.

Further, data used for information processing by the accelerator control program is stored in, for example, the hard disk drive 1031 as the program data 1094. Thereafter, the CPU 1020 reads the program module 1093 and the program data 1094 stored in the hard disk drive 1031 into the RAM 1012 when necessary, and executes each of the procedures described above.

The program module 1093 and the program data 1094 related to the accelerator control program are not limited to being stored in the hard disk drive 1031, and may also be stored in, for example, a removable storage medium and read out by the CPU 1020 via the disk drive 1041 or the like. Alternatively, the program module 1093 and the program data 1094 related to the accelerator control program may be stored in another computer connected via a network such as a LAN or a wide area network (WAN) and may be read by the CPU 1020 via the network interface 1070.

Although the embodiments to which the invention made by the present inventor is applied have been described above, the present invention is not limited by the descriptions and drawings forming a part of the disclosure of the present invention according to the embodiments. That is to say, other embodiments, examples, operation techniques, and the like made by those skilled in the art on the basis of the embodiment are all included in the scope of the present invention.

REFERENCE SIGNS LIST

10 Accelerator control device
11a Data buffer (storage nit)
11b Metadata buffer (storage unit)
11c Intermediate data buffer (storage unit)
12 Memory management function
13 Metadata control function
13a Polling function (determination unit)
13b Writing function
14 API
20 Accelerator
20a Transfer source accelerator
20b Transfer destination accelerator
21 Metadata access mechanism
21a Polling function (acquisition unit)
21b Reading function
21c Writing function (storage unit, transfer unit)
21d Inter-accelerator metadata communication mechanism (checking unit)
22 Function control block
22a Metadata analysis function
22b Data transfer control function
22c Completion notification function
22d Transfer destination accelerator notification function
23 Data transfer function
23a Data reading function
23b Data writing function
24 Arithmetic function (arithmetic unit, second transfer unit)

The invention claimed is:

1. An accelerator control system comprising:
an accelerator control device; and a plurality of accelerators,
wherein the accelerator control device includes:
first processing circuitry configured to:
store control data including a location of data which is an arithmetic processing target, information on an accelerator for performing arithmetic processing, and information specifying content of the arithmetic processing of the accelerator; and
determine completion of the arithmetic processing by the accelerator when the control data which has been subjected to the arithmetic processing by the accelerator is stored in a storage, and
each of the accelerators includes:
second processing circuitry configured to:
acquire the control data from the storage;
perform the arithmetic processing on the data which is an is the arithmetic processing target according to the location of the data which is an is the arithmetic processing target and the information specifying the content of the arithmetic processing of the accelerator included in the acquired control data;
store the control data in the storage when the arithmetic processing is completed and the control data does not include information on a transfer destination accelerator;
transfer the control data to the transfer destination accelerator when the control data includes information on the transfer destination accelerator; and
perform the arithmetic processing on the data which is the arithmetic processing target according to the location of the data which is the arithmetic processing target and the information specifying the content of the arithmetic processing included in the control data when the control data has been received from another accelerator.

2. The accelerator control system according to claim 1, wherein the second processing circuitry is further configured to check whether or not the control data is receivable from another accelerator.

3. The accelerator control system according to claim 2, wherein the second processing circuitry is further configured to retransmit the control data when the transfer destination accelerator does not notify of whether or not the control data is receivable within a predetermined time.

4. The accelerator control system according to claim 1, wherein the second processing circuitry is further configured to:
store a result of the arithmetic processing performed on the data which is the arithmetic processing target in the storage when the control data has been transferred to the transfer destination accelerator, and
read the result of the arithmetic processing stored in the storage and set the result of the arithmetic processing as the arithmetic processing target.

5. The accelerator control system according to claim 1, wherein the second processing circuitry is further configured to monitor whether or not the control data is present in the storage.

6. The accelerator control system according to claim 1, wherein the first processing circuitry is further configured to monitor whether or not the control data which has been subjected to the arithmetic processing is present in the storage.

7. An accelerator control method executed by an accelerator control system including an accelerator control device and a plurality of accelerators, wherein the accelerator control system includes a storage configured to store control data including a location of data which is an arithmetic processing target, information on an accelerator for performing arithmetic processing, and information specifying content of the arithmetic processing of the accelerator, the accelerator control method comprising:
acquiring the control data from the storage;
performing the arithmetic processing on the data which is the arithmetic processing target according to the location of the data which is the arithmetic processing target and the information specifying the content of the arithmetic processing of the accelerator included in the acquired control data;
determining that the arithmetic processing is completed and the control data does not include information on a transfer destination accelerator;
storing the control data in the storage when the accelerator control system has determined that the arithmetic processing is completed and the control data does not include information on a transfer destination accelerator;
determining that the control data which has been subjected to the arithmetic processing is stored in the storage;
determining completion of the arithmetic processing when the accelerator control system has determined that the control data which has been subjected to the arithmetic processing is stored in the storage;
transferring the control data to the transfer destination accelerator when the control data includes information on the transfer destination accelerator;
determining that the control data has been received from another accelerator; and
performing the arithmetic processing on the data which is the arithmetic processing target according to the location of the data which is the arithmetic processing target and the information specifying the content of the arithmetic processing included in the control data when the accelerator control system has determined that the control data has been received from another accelerator.

8. A non-transitory computer-readable recording medium storing therein an accelerator control program that causes a computer to execute a process comprising:
acquiring control data from a storage configured to store the control data including a location of data which is an arithmetic processing target, information on an accelerator for performing arithmetic processing, and information specifying content of the arithmetic processing of the accelerator;
performing the arithmetic processing on the data which is the arithmetic processing target according to the location of the data which is the arithmetic processing target and the information specifying the content of the arithmetic processing of the accelerator included in the acquired control data;
storing the control data in the storage when the arithmetic processing is completed and the control data does not include information on a transfer destination accelerator;
determining completion of the arithmetic processing when the control data which has been subjected to the arithmetic processing is stored in the storage;
transferring the control data to the transfer destination accelerator when the control data includes information on the transfer destination accelerator; and performing the arithmetic processing on the data which is the arithmetic processing target according to the location of the data which is the arithmetic processing target and the information specifying the content of the arithmetic processing included in the control data when the control data has been received from another accelerator.

* * * * *